Figure 1:
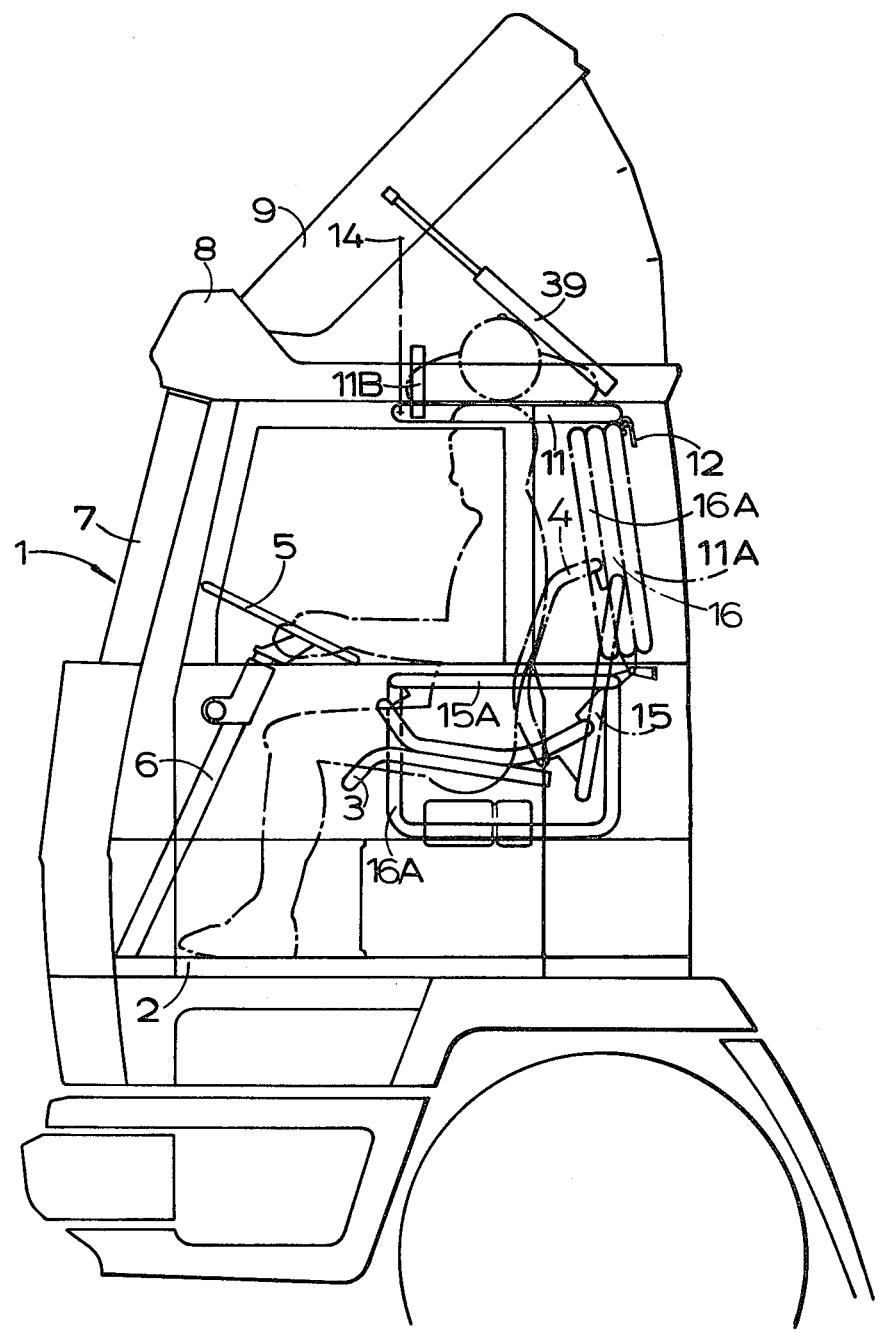

United States Patent [19]

Taylor et al.

[11] 4,379,583

[45] Apr. 12, 1983

[54] VEHICLE CABS HAVING AIRFLOW DEFLECTORS ON THEIR ROOFS

[75] Inventors: Merrick W. Taylor; George R. Allen, both of Warwickshire; Terence Strong, Coventry, all of England

[73] Assignee: Motor Panels (Coventry) Limited, Coventry, England

[21] Appl. No.: 231,391

[22] Filed: Feb. 4, 1981

[51] Int. Cl.³ .................. B62D 35/00; B62D 33/06
[52] U.S. Cl. ............................. 296/1 S; 296/37.7; 296/140; 296/190
[58] Field of Search .............. 296/1 S, 190, 37.7, 296/216, 221, 224, 140

[56] References Cited

U.S. PATENT DOCUMENTS

| | | | |
|---|---|---|---|
| 4,006,931 | 2/1977 | Groves | 296/1 S |
| 4,082,340 | 4/1978 | Taylor | 296/1 S |
| 4,087,124 | 5/1978 | Wiley, Jr. | 296/1 S |
| 4,121,684 | 10/1978 | Stephens et al. | 296/190 |
| 4,156,543 | 5/1979 | Taylor et al. | 296/1 S |
| 4,201,415 | 5/1980 | Suchanek | 296/190 |
| 4,215,899 | 8/1980 | Schmidt et al. | 296/190 |

Primary Examiner—Richard A. Bertsch
Attorney, Agent, or Firm—Scrivener, Clarke, Scrivener and Johnson

[57] ABSTRACT

A vehicle cab has an airflow deflector (9) pivotally mounted on it for movement between a lowered position and a raised position in which the deflector is inclined upwardly and rearwardly from a front upper portion of the cab, and the deflector has, or is associated with, side and rear walls which together with the deflector define a compartment above the cab when the deflector is in a raised position. Access can be gained into the compartment from inside the cab. A bunk (11) can be provided in the compartment for a person to sleep in the compartment. Seats in the cab have back rests (4) which fold down on to the seats, or can be removed, so that a bunk, which is stowed at the back of the seats when not in use, can also be erected in the cab over the seats.

In one embodiment the deflector (9) is pivoted to a frame (8) mounted around the top of the cab, and the side and rear walls are provided by a cover (26) of flexible material which is secured to the deflector, frame and cab roof structure and folds in concertina fashion when the deflector is lowered. In another embodiment the deflector is formed by an upper part of a pod mounted on the cab, the upper part being hinged to a lower part to enable the deflector to be pivoted between raised and lowered positions. The upper part may be raised at the front relative to the lower part to increase the capacity of the compartment formed by the interior of the pod.

9 Claims, 8 Drawing Figures

VEHICLE CABS HAVING AIRFLOW DEFLECTORS ON THEIR ROOFS

This invention relates to vehicle cabs which have airflow deflectors on their roofs to reduce drag losses.

Road freight vehicles have such cabs. The vehicles are usually, but not necessarily, tractor units for drawing semi-trailers and van trailers. Frequently semi-trailers carry standard freight containers the height of which exceeds that of the cab of the tractor, as does the height of a van trailer. This gives rise to turbulent airflow when the tractor/trailer combination is in motion, thereby increasing fuel consumption. It has become the practice to fit a deflector of generally plate form to the roof of the cab. The deflector extends across the roof of the cab and is inclined upwardly towards the rear to substantially the same height as that of the load so as to improve the airflow and consequently save fuel. It may be laid flat, or removed, when the height of the load does not exceed that of the cab.

The present invention consists in a vehicle cab having an airflow deflector of generally plate form extending over substantially the same width as the cab and pivoted adjacent a front edge, directly or indirectly, to a front upper portion of the cab, the deflector also having or being associated with side walls and a rear wall, means to swing the deflector upwardly about its pivot and means to retain the deflector in a raised position whereby the deflector and the side and rear walls define a compartment above the cab.

The side and rear walls may be of flexible material and preferably comprise inner and outer skins of flexible material. The walls may comprise flexible wall members, for example of plastics material, which are connected along one long edge to the roof of the cab and along an opposed long edge to the deflector, the latter being pivoted adjacent its front edge to the roof of the cab adjacent the front thereof.

Access may be gained to the compartment from within the cab. An opening may be made in the roof of the cab for that purpose. The opening may permit access to an upper bunk provided to be erected in the cab for use when the normal seating accommodation is vacated. A lower bunk may then be erected above the normal seating accommodation and below the upper bunk.

In an alternative construction the deflector and side and rear walls may comprise the upper part of a pod having a lower part secured to the roof of the cab. The pod may contain front and rear bunks set transversely above the cab. The bunks become accessible to the crew of the vehicle when the deflector is swung upwardly. The front of the pod may include a member to which the upper part is pivotally connected and which is rotatable relative to the lower part to enable the upper part to be raised at the front so as to increase the capacity of the pod and provide additional headroom above the front bunk. The position of the deflector is, in each case, adjustable between lowered and raised positions and may also be adjustable into intermediate positions if desired.

Figure 2:
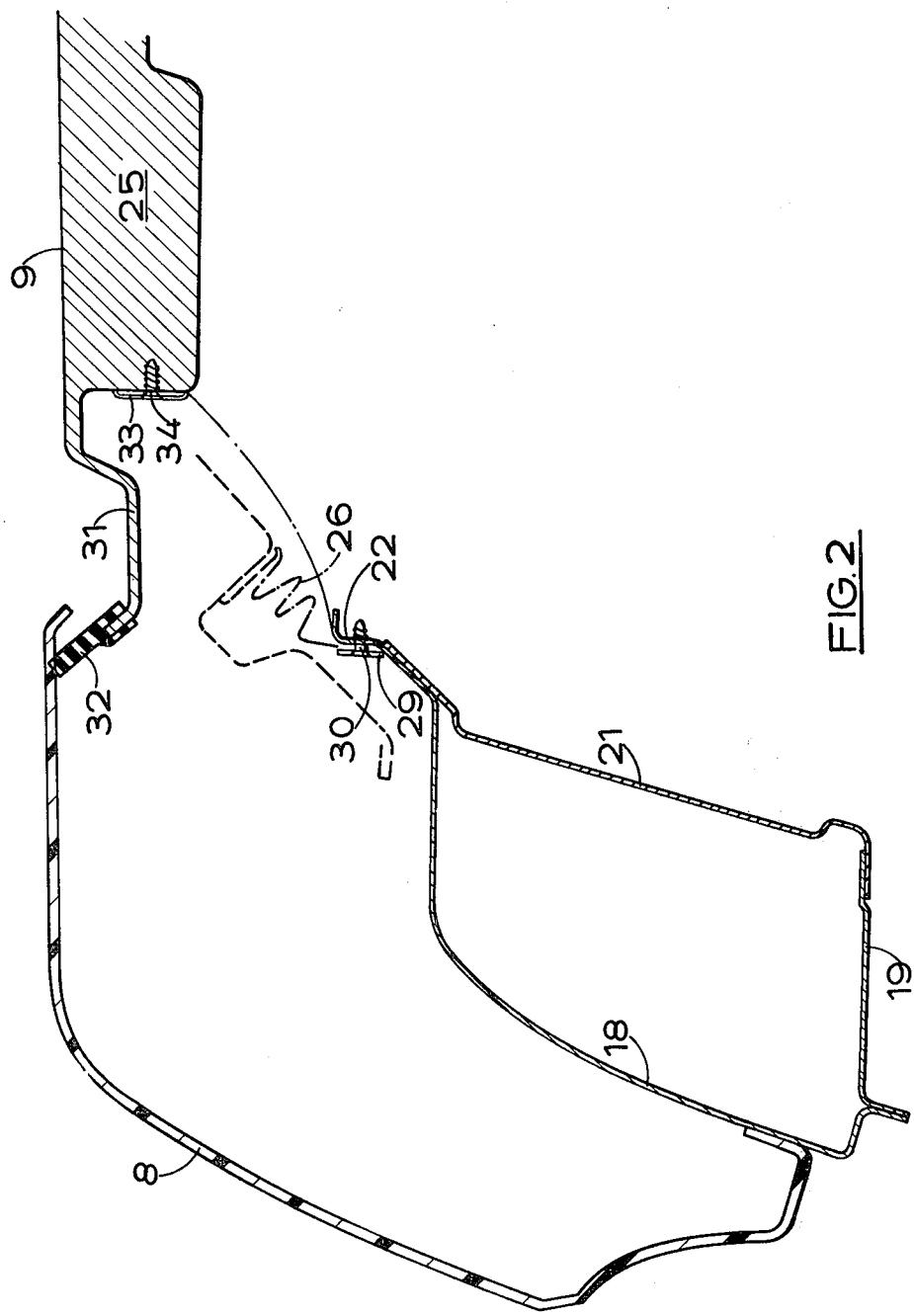

Two embodiments of the invention will now be described by way of example with reference to the accompanying drawings in which:

FIG. 1 is a schematic side elevation of part of a vehicle cab in accordance with the invention, FIG. 2 is an enlarged fragmentary vertical section on the longitudinal centreline of the cab showing the front part of an airflow detector and the adjacent cab structure.

Figure 3:
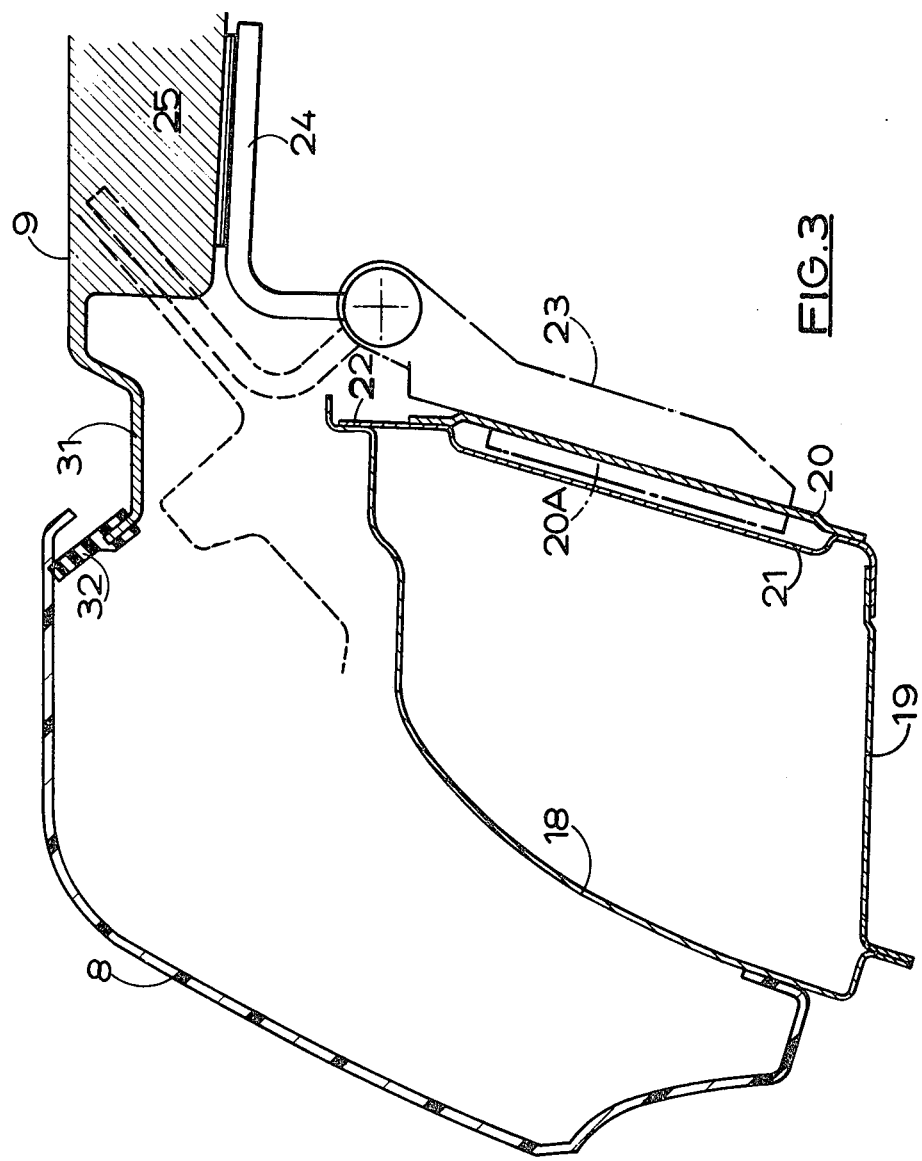
Figure 4:
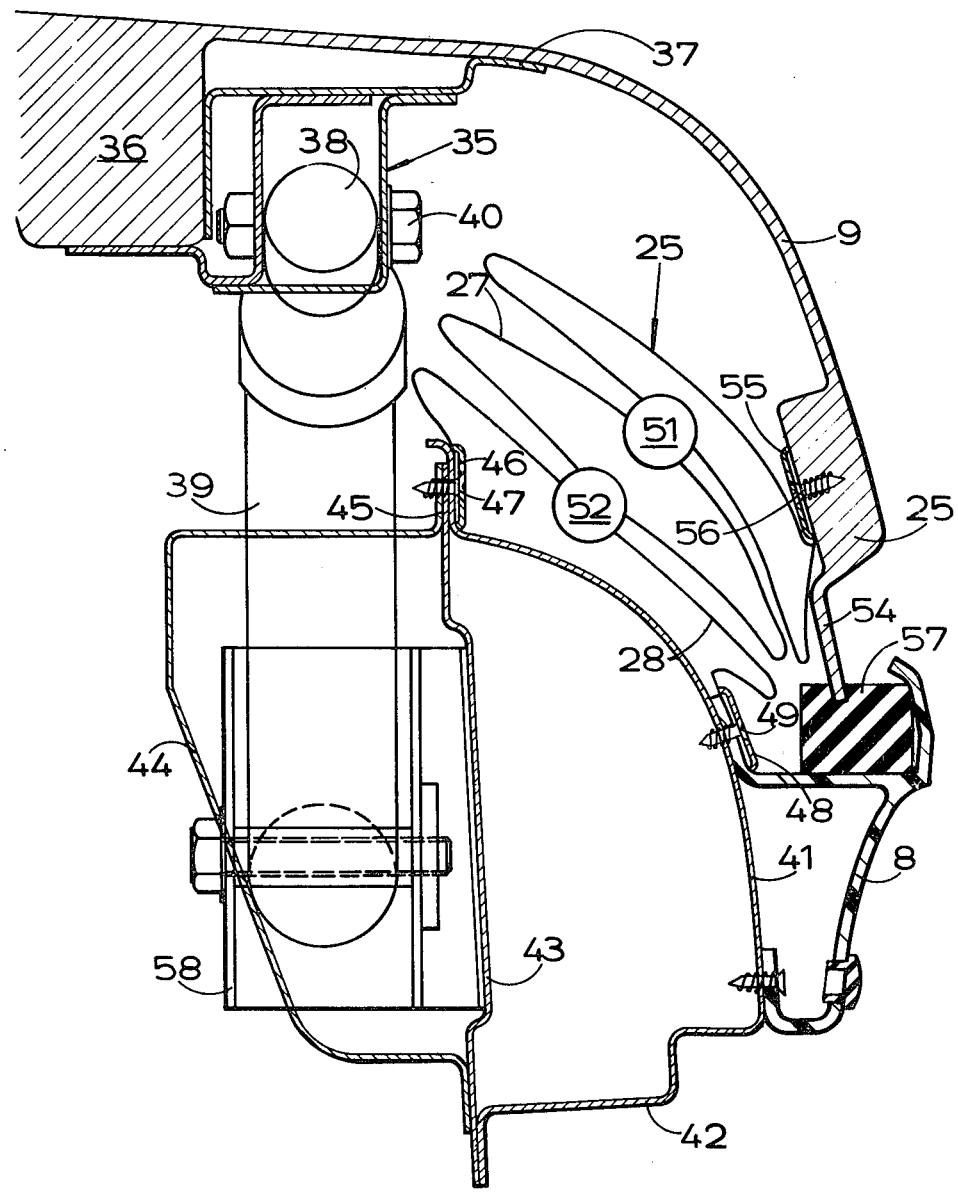
Figure 5:
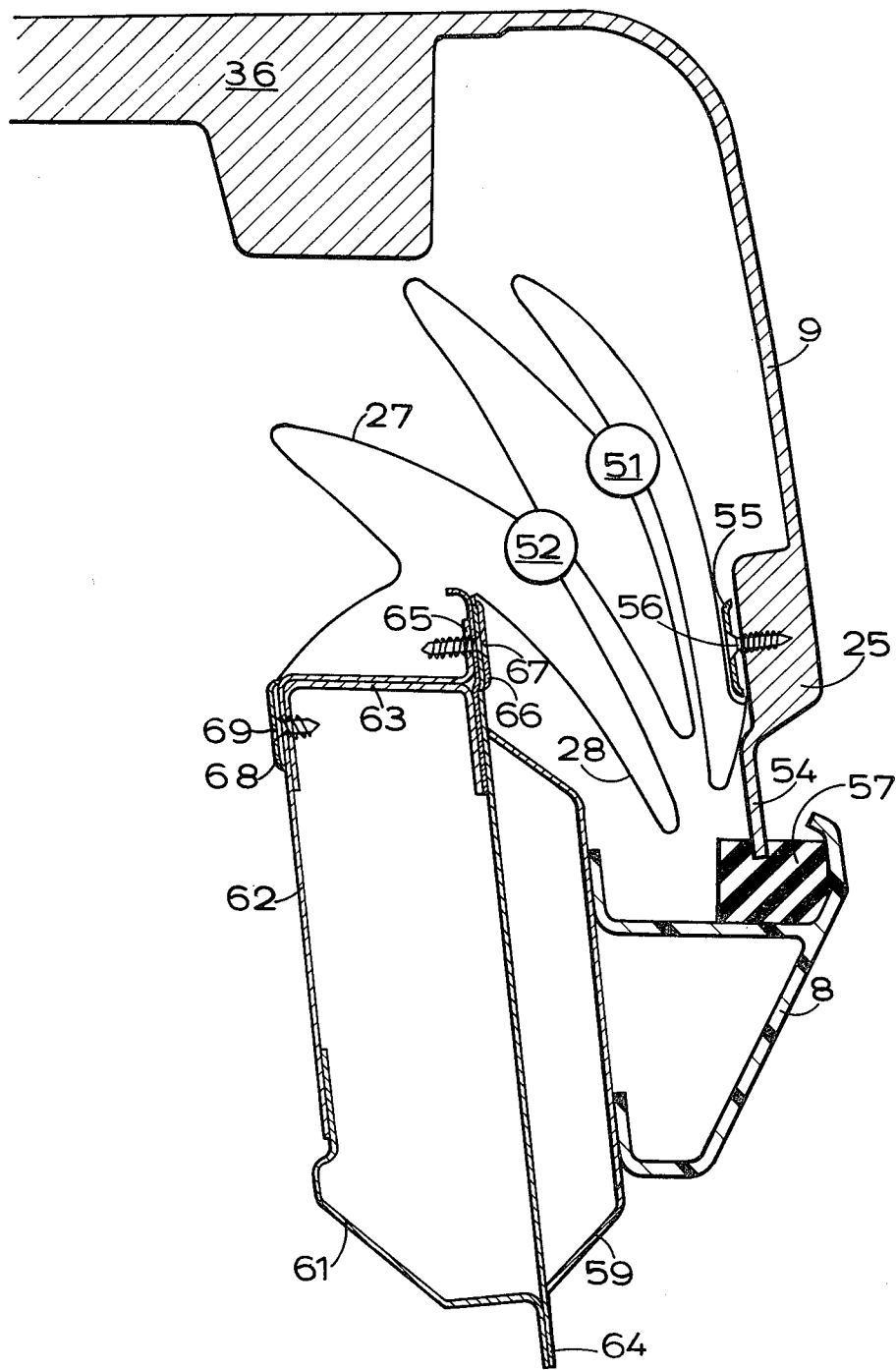
Figure 6:
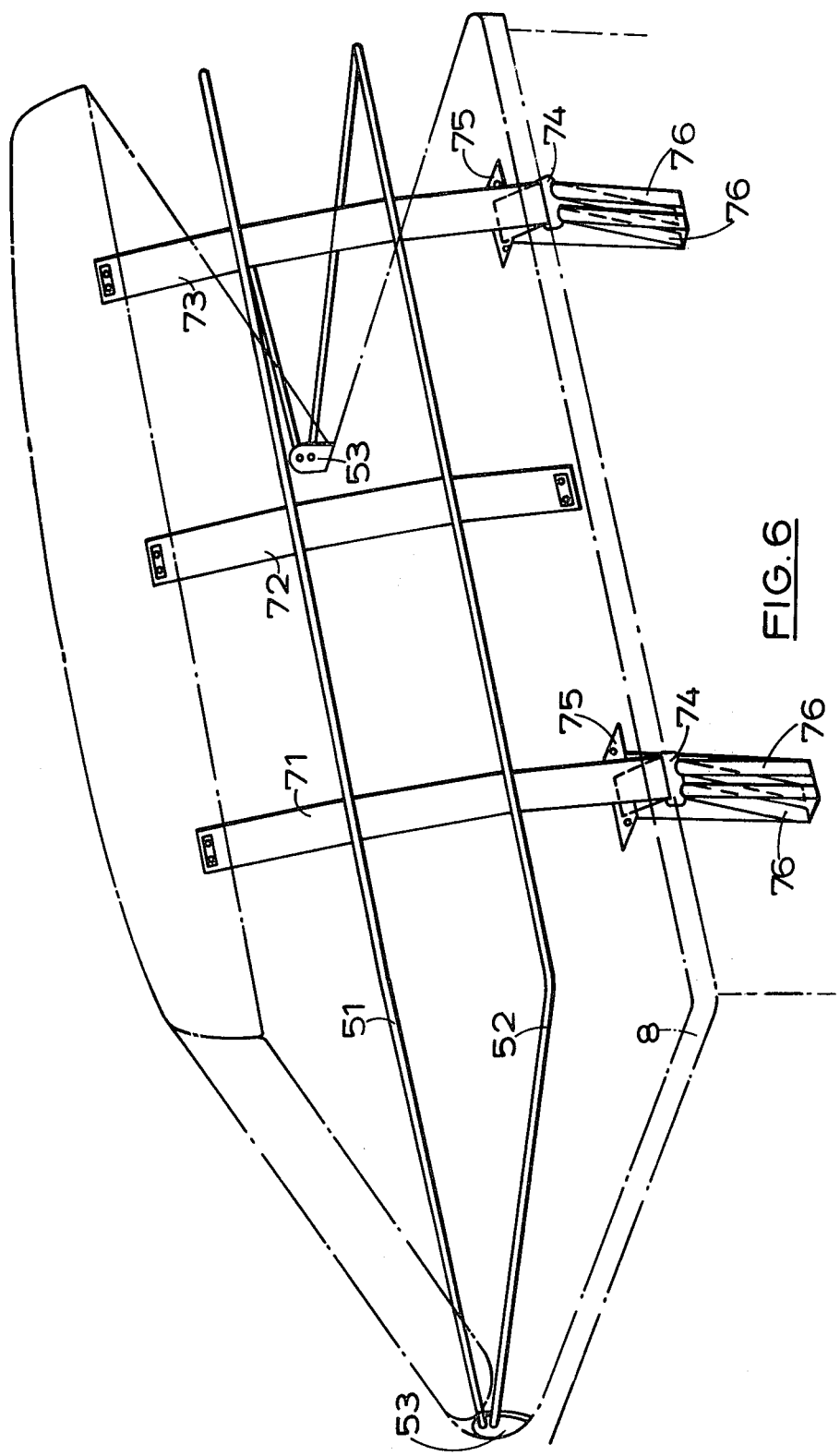
Figure 7:
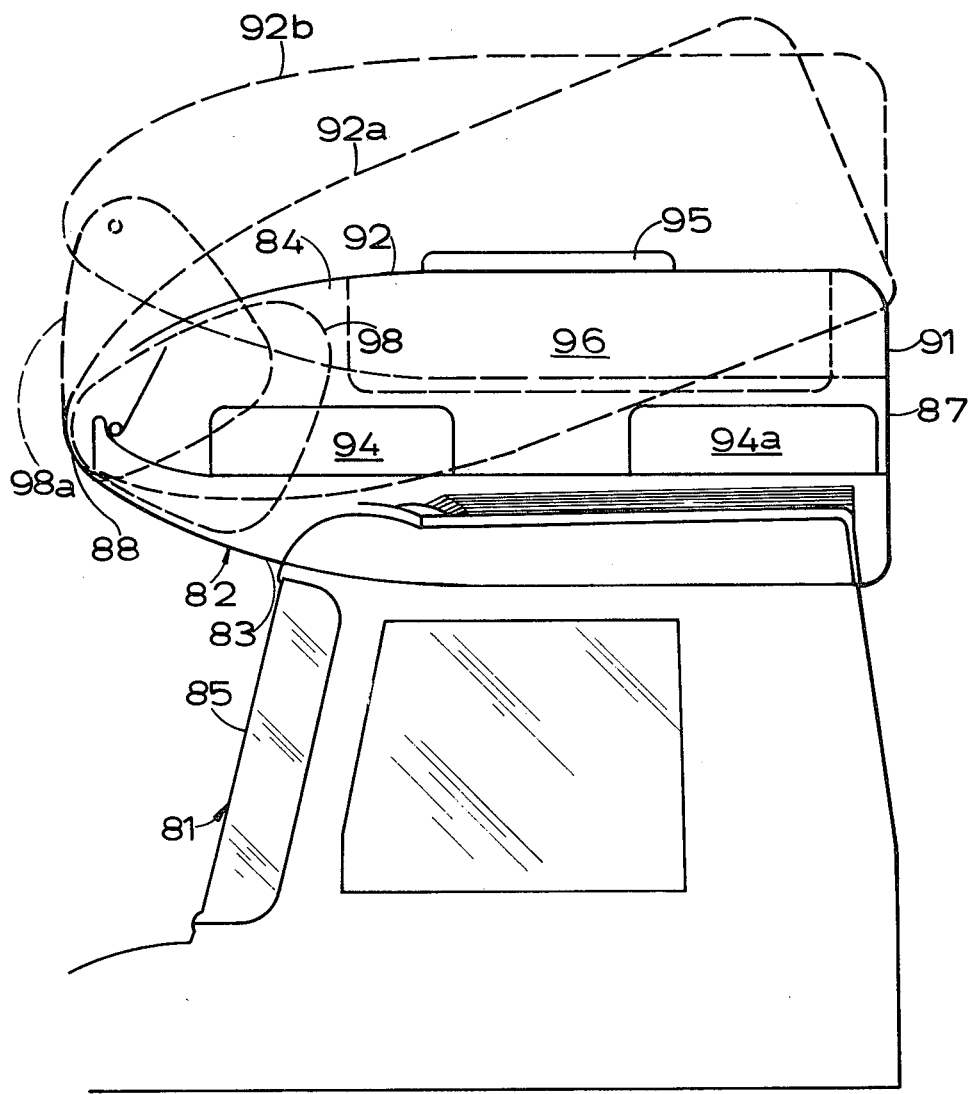
Figure 8:
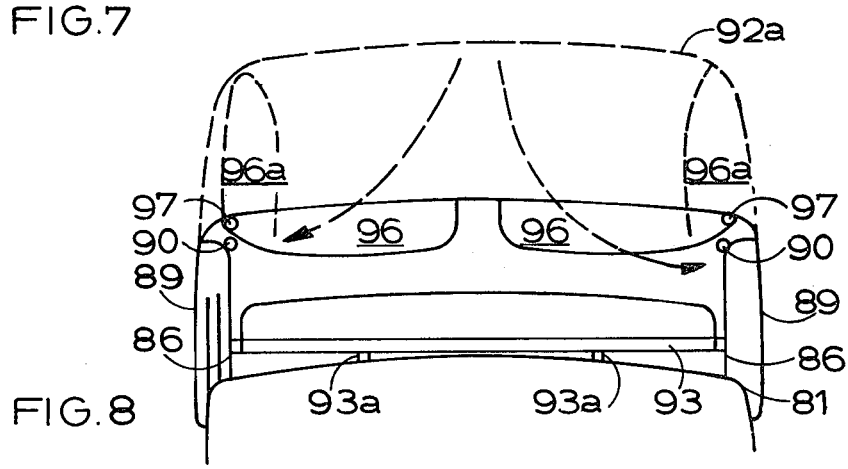

FIG. 3 is an enlarged fragmentary vertical section at a hinge between the deflector and the adjacent cab structure, FIG. 4 is a fragmentary vertical section through the deflector and cab roof taken transversely of the cab, FIG. 5 is a fragmentary vertical section through a rear part of the deflector and cab roof taken longitudinally of the cab, FIG. 6 is a schematic perspective view from the rear and one side of the deflector showing a tensioning mechanism for an associated rear wall, FIG. 7 is a schematic side elevation of part of a vehicle cab in accordance with a second embodiment of the invention in which an airflow deflector forms part of a pod mounted above the cab, and FIG. 8 is a schematic vertical section through the pod of FIG. 7 taken transversely of the cab.

Referring to FIG. 1 there is shown the outline of a vehicle cab 1 having a floor 2, a seat 3, seat backrest 4, steering wheel 5 and steering column 6. A windscreen 7 is secured in the frame of the cab in known manner by a rubber grommet (not shown). The cab has a roof frame structure encompassed by a frame 8. A deflector 9 of generally plate form is pivotally mounted on the roof frame structure, the deflector being shown in a raised position.

When the seating accommodation across the cab is vacated the backrest 4 may be folded down forwardly from an upright position of use as shown in broken lines in FIG. 1 to rest on the seat 3 as shown at 4A in full lines. An upper bunk 11 which lies lengthwise across the back of the cab is pivotally suspended from the rear of the cab by a hinge 12 and can be swung forwardly and upwardly from a stowed position shown in broken lines in FIG. 1 at 11 to an erected position, as shown in full lines. It is maintained in the erected position by straps 11B which are removably engaged in the roof frame structure at each side. Straps 13, free ends 14 of which are removably engaged in mountings in the deflector 9, are provided to restrain an occupant from falling out of the upper bunk 11.

A lower bunk may be constituted by bunk portions 15 on the back of the back rests 4 of the driver's and mate's seats together with an intermediate bunk portion 16. The latter may be mounted across the back of the cab so that it can be moved, for example by pivoting downwardly, from a vertical position, as shown in broken lines in FIG. 1, to a horizontal position. In the horizontal position, in which it may be supported by folding legs 16A, it lies between and is aligned with the bunk portions 15 (when the latter are in the positions indicated at 15A they occupy when the back rests 4 are folded down as described above) so as together with bunk portions 15, to constitute a composite bunk. Alternatively a complete lower bunk may be normally stowed lengthwise across the back of the cab, for example behind the upper bunk 11. This lower bunk may be pivotally mounted so that it can be swung forwardly and downwardly to its in-use position, resting, for example, on stops, one on each door of the cab. This lower bunk can be swung to the in-use position when the upper bunk has been erected. As an alternative to folding down the back rests 4 of the seats the back rests may be made readily removable to allow a lower bunk to be erected over the seats.

The roof frame structure of the cab provides an opening to allow access to the upper bunk when the deflector 9 is in the, or a, raised position.

When the bunks or upper bunk and intermediate bunk portion 16, as the case may be, are not in use they are stowed away across the back of the cab and the seat backrests are in upright positions. The deflector 9 may be lowered and secured to the roof of the cab or secured in a raised position depending on the height of, or absence of, a load drawn by the vehicle.

Referring now to FIGS. 2 and 3, across the front of the cab, above the windscreen, is a curved plate 18 forming part of a box section together with plates 19, 21. The plates 19, 21 are joined, as by welding, and provide an upstanding transverse flange 22. One arm 23 of a hinge is secured to a plate 20 which is itself secured, as by welding, to the plate 21. The other arm 24 of the hinge is secured, as by bolts, to the deflector 9 at a reinforced portion 25 thereof.

The arm 23 of the hinge is secured by bolts which pass through over-size holes in the plate 20 to a mounting plate 20A retained below the plate 20 and the plate 21. The mounting plate 20A is free to move a limited amount because of the over-size holes through which the securing bolts pass and this facilitates adjustment of the deflector 9 relative to the cab to ensure correct fitment of the deflector on the cab for use.

A flexible cover 26 surrounds the opening in the roof frame structure of the cab. The cover preferebly comprises inner and outer skins 27 and 28 respectively of flexible material of which the outer skin is waterproof. A front lower edge of the cover is secured along the outside of the flange 22 by trim strips 29 and self tapping screws 30. The cover, which has been omitted from FIG. 3 for clarity, may be formed with fold lines in the manner of a concertina.

The deflector 9 may comprise one or more mouldings of plastics, preferably glass reinforced plastics, or it may comprise one or more metal components, conveniently metal pressings. The deflector 9 has, at the front, a trough shaped flange 31 a free edge of which carries a sealing strip 32, for example of rubber. The sealing strip 32 seals against the inside of the front of the frame 8 when the deflector is in the lowered position, as shown in FIGS. 2 and 3. The frame 8 may be made in a number of sections, for example front, two sides and rear sections and provision (not shown) is made for draining the enclosure formed between the frame and plate 18 of the roof frame structure of the cab. The upper edge of the cover 26 is secured to the reinforced portion 25 of the deflector 9 by a trim strip 33 and screws 34.

Referring now to FIG. 4, a mounting 35 fabricated from three plates is secured to a further reinforced portion 36 of the deflector and to an outer part thereof at 37. The mounting 35 receives the piston rod end 38 of a double acting hydraulic actuator 39 and the rod end is retained in the mounting by a bolt 40 and a nut. There are two of the actuators 39, one on each side of the cab.

The side and roof of the cab are joined by a curved plate 41, FIG. 4, which, together with plates 42, 43, forms a box section. A formed plate 44 is secured at top and bottom to said plate 43. Upper edges of the plates 41, 43, 44 are joined to provide an upstanding flange 45 whose front end forms a continuation of the flange 22. The inner skin 27 of the cover 25 is secured to the outside of the upstanding flange 45 by a trim strip 46 and screws 47 and the outer skin 28 is secured to the frame 8 and plate 41 by a trim strip 48 and screws 49. The inner and outer skins 27, 28 are connected to two roof stick 51, 52 (best seen in FIG. 6). The ends of the roof sticks are pivoted to the frame 8 at the front, as shown at 53. The deflector 9 is curved downwardly at the side terminating in a flange 54 extending from a continuation of the reinforced portion 25 of the deflector. The inner and outer skins 27, 28 are secured along their upper edges to the reinforced portion 25 by a trim strip 55 and screws 56. When the deflector 9 is in the lowered position the edge of the flange 54 engages a sealing member 57, for example a rubber strip, which is mounted in the frame 8.

A mounting 58, in which the cylinder end of the actuator 39 is pivotally mounted, is secured as by welding, to the plate 43. The actuator and its mountings are duplicated on the other side of the cab and deflector.

Turning now to FIG. 5, the cab roof frame structure at the rear includes a pressing 59 which with pressings 61, 62, 63 forms a box section, the pressings being secured together as by welding. A depending flange 64 forms the upper part of an opening to receive a rear window of the cab. An upstanding flange 65 has the outer skin 28 of the cover secured to it by a trim strip 66 and screws 67. The inner skin 27 of the cover is secured to the pressing 62 by a trim strip 68 and screws 69. The flange 54 of the deflector continues from the sides of the deflector around the rear edge and seals against the sealing strip 57 in the frame 8.

Referring now to FIG. 6, webbing straps 71, 72, 73 are secured at their upper ends to the deflector 9. The lower end of the strap 72 is secured to the pressing 62 (FIG. 5). The lower end of each strap 71, 73 passes through a buckle 74 and is secured to the top of a tension box 75 which is secured to the pressing 62. Elasticated straps 76 pass around the buckles 74 and have their ends secured in the bottom of the tension boxes 75. Intermediate their ends the straps 71, 72, 73 are secured to the roof sticks 51, 52. The straps 76 are under tension and consequently as the deflector 9 is lowered those sections of the cover 26 between the deflector 9 and the roof sticks 51, 52 are maintained under tension.

Referring again to FIG. 4, one method of securing the frame 8 to the cab roof frame structure is indicated in which use is made of the, or some of the, self tapping screws 30 which are inserted through registering holes in the inner and outer walls of the frame 8 and hole in the plate 41. The holes in the outer wall of the frame 8 are then plugged with caps 30A of plastics material.

The deflector 9 is raised and lowered, and retained in raised and lowered positions, by the actuators 39. A known hydraulic power pack is provided whereby the operation of one switch starts an electric motor to drive the pump and opens a solenoid valve to admit hydraulic fluid under pressure to one side of the actuators causing them to extend. Release of the switch stops the movement and operation of another switch likewise causes the actuators to be retracted.

If desired a mechanical lock of any convenient type may be provided between the deflector, preferably at or towards the rear thereof, and the cab, so that the deflector can be securely locked in the lowered position. The lock may be released directly manually or by remote control when it is desired to raise the deflector. Instead of the flexible cover to provide the side and rear walls of the compartment other constructions may be used. For example a sliding plate or a hinged plate type construction may be used. These are, however, likely to be more difficult to produce than the flexible cover type construction which has been described.

Turning now to FIGS. 7 and 8, the outline of one side of a cab is shown at 81. A pod 82 is secured to the roof of the cab. The pod may be permanently or removably secured to the cab. The pod 82 comprises a lower part 83 which is secured to the roof of the cab and an upper part 84 which is pivotally connected to the lower part 83 at the front and can be raised about the pivot thus constituting a deflector. It will be seen that the pod 82 extends forwardly beyond the windscreen 85 of the cab and the rear of the pod extends substantially to the rear of the cab. The longitudinal section of the pod is of aerofoil shape so as to minimise drag forces.

The lower part 83 of the pod comprises an open-topped box with side walls 86, FIG. 8, and a rear wall 87, and there is open access across the front to receive the curved front wall 88 of the upper part 84. The bottom of the lower part 83 has an opening corresponding to the shape of the roof of the cab and a seal 80 is provided around the opening, bearing on the roof of the cab.

The upper part 84 of the pod 82 comprises side walls 89, a rear wall 91 and a slightly rounded top 92 which correspond to the deflector 9 of the previously described embodiment. The side walls 89, and rear wall 91 lie outside the side walls 86 and rear wall 87 respectively of the lower part 83 when the pod is closed, as can be seen in FIG. 8. A seal 90 is provided at the top of the side walls 86 and rear wall 87 so as to seal the inside of the pod when the upper part 84 is raised. A seal, not shown, is similarly provided across the front between the upper and lower parts of the pod.

Transverse supports 93 are provided extending between the side walls 86 of the lower part 83, as shown in FIG. 8. These support two bunks 94, 94a extending crosswise of the roof of the cab, that is from side to side thereof, one, 94, above the front of the cab and the other, 94a, above the rear of the cab. As seen in FIG. 7, there is a gap between the bunks 94, 94a and this is located above where a ventilator is usually fitted in the roof of the cab. When the pod is fitted the ventilator is removed and it may be relocated in the top 92 of the upper part 84 of the pod as indicated at 95. The opening in the cab roof left by removal of the ventilator allows access to the pod. The supports 93 may have pads 93a which bear on the roof of the cab.

Two lockers, may be fitted to the underside of the top 92 of the pod, as indicated at 96. At their outer edges these may be hinged to the top, as at 97, and they may be mechanically locked in the raised, stowed position, shown in FIGS. 7 and 8, at their inner edges. When the top 92 is raised the locks can be released so that the lockers swing down into a vertical position 96a, FIG. 8, in which they may provide hanging space for clothes. The lockers are raised and locked in the horizontal position again before lowering the top 92. The raised position of the top 92 is as shown in broken lines at 92a, in FIG. 8.

It will be seen from FIG. 7 that the headroom above the front bunk 94 is appreciably less than that available above the rear bunk 94a. If it is desired to provide additional headroom above the front bunk the hinge construction at the front of the pod may be modified as follows. The upper part 84 may be hinged to a member 98, shown in broken lines, which extends across the front of the pod, and the member 98 may be hinged to the lower part 83. This arrangement will allow the top 92 of the pod to be raised to the position 92a as shown, or to a desired intermediate position, so that it performs the desired function as a deflector. Additionally provision is made, for example with pneumatic or hydraulic struts, to rotate the member 98 upwardly to the position shown in broken lines at 98a. With the member 98 in position 98a the top 92 of the pod takes up the position shown in broken lines at 92b, thus substantially increasing the headroom above the front bunk. The member 98 is normally locked in the down position. It will be appreciated that seals are provided between the upper part 84, member 98 and lower part 83.

For its normal use for deflecting airflow the deflector is raised, if necessary, so that its rear edge is substantially at the height of a load at the rear of the vehicle cab. At the end of a journey if this load is discharged, or changed, the deflector is reset accordingly. If there is no load projecting above the height of the cab (or cab plus pod) the deflector is lowered. For crew rest periods, when the vehicle is not in motion the deflector, or deflector and front member 97 as the case may be, are raised allowing access to the bunks. A ladder may be provided in the cab to facilitate access to the bunks.

Conventionally a sleeper cab for a vehicle provided with bunks is longer than a day cab not provided with bunks because the bunks are fitted behind the seating accommodation, and because regulations require provision of a certain minimum headroom above each bunk. By using the deflector, to, in effect, raise the roof of the cab the regulations can be met by a day cab subject to the necessary modifications which have been described. The shorter length of a day cab reduces the weight of the vehicle and so contributes to fuel economy, and also enables a reduced length vehicle/trailer combination to be used which improves manoeuvrability, or, conversely, more length of loading space without increasing the overall length of the vehicle.

We claim:

1. A vehicle cab in which is a driver's seat and which has an airflow deflector on a roof thereof of generally plate form extending over substantially the same width as the cab, pivotal connecting means between said deflector adjacent a front edge thereof and a front upper portion of the cab whereby said deflector can be swung about a horizontal axis between raised and lowered positions relative to the cab, side walls and a rear wall extensibly connected between said deflector and the cab, means for swinging said deflector upwardly about said pivotal connecting means and means to retain said deflector in a raised position at which said deflector and said side and rear walls define a compartment above the cab, an opening in the roof of the cab providing access to said compartment from the cab, and a bunk extending transversely of the cab in an elevated position within the envelope defined by the cab and said compartment and substantially directly above said driver's seat, said bunk being accessible by way of said opening when said deflector is in a raised position.

2. A vehicle cab according to claim 1 in which said driver's seat includes a back rest constructed and arranged to be movable from an upright position to an alternative position, and a second bunk is provided which is erectable transversely of the cab over said seat when said back rest has been moved to said alternative position.

3. A vehicle cab according to claim 1 including a passenger seat in substantially transverse alignment with said driver's seat, said seats each having a back rest constructed and arranged to be movable from an upright position to a generally horizontal position over said respective seat in which position said back rests constitute end portions of a second bunk, and an intermediate bunk portion erectable between said end portions whereby said end portions and said intermediate portion together constitute said second bunk.

4. A vehicle cab according to claim 1 in which said side walls and rear wall are of flexible material and in which tensioning means is provided for tensioning said rear wall, said tensioning means including a strap having an upper end secured to said deflector at the rear thereof, a lower end secured to the rear of the cab and a member slidable along said strap, resilient means connected to said member and loading said member in a downward direction and means securing said strap to said rear wall.

5. A vehicle cab according to claim 1 including a frame around the top of the cab and co-operating means between said frame and said deflector forming a seal around the periphery of said deflector when said deflectors is in said lowered position.

6. A vehicle cab according to claim 1 including a pod mounted above the cab, said pod comprising co-operating upper and lower parts which are pivotally connected adjacent the front of said pod, said opening communicating with the interior of said lower part and said upper part forming said deflector and being pivotal between raised and lowered positions relative to said lower part.

7. A vehicle cab according to claim 6 in which said lower part has side and rear walls and said upper part has side and rear walls which overlap said side and rear walls of said lower part, said side and rear walls of said upper and lower parts in combination defining said side and rear walls of said compartment when said deflector is in a raised position.

8. A vehicle cab according to claim 7 in which said pod includes at the front thereof a member to which said upper part is pivotally connected and which is connected to said lower part for rotation relative thereto, the construction and arrangement of said member being such that by rotation thereof relative to said lower part, said upper part is caused to be raised at the front of said pod thereby increasing the capacity of said pod.

9. A vehicle cab according to claim 6 in which said bunk is mounted in said pod at the rear thereof and a second bunk is mounted in the front of said pod transversely of the cab.

* * * * *